US009296834B2

(12) United States Patent
Giguere et al.

(10) Patent No.: US 9,296,834 B2
(45) Date of Patent: Mar. 29, 2016

(54) PROCESS FOR PREPARING A POLYETHYLENE PRODUCT IN A POLYMERIZATION LOOP REACTOR

(71) Applicant: TOTAL RESEARCH & TECHNOLOGY FELUY, Seneffe (BE)

(72) Inventors: Robin Giguere, San Francisco, CA (US); Denis Mignon, Braine-l'Alleud (BE); Philippe Tanguy, Chatou (FR); Louis Fradette, Montreal (CA)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 0 days.

(21) Appl. No.: 14/398,021

(22) PCT Filed: May 3, 2013

(86) PCT No.: PCT/EP2013/059217
§ 371 (c)(1),
(2) Date: Oct. 30, 2014

(87) PCT Pub. No.: WO2013/164437
PCT Pub. Date: Nov. 7, 2013

(65) Prior Publication Data
US 2015/0112034 A1 Apr. 23, 2015

(30) Foreign Application Priority Data
May 4, 2012 (EP) .................................... 12166881

(51) Int. Cl.
*C08F 2/00* (2006.01)
*C08F 210/00* (2006.01)
(Continued)

(52) U.S. Cl.
CPC .................. *C08F 2/01* (2013.01); *B01J 8/007* (2013.01); *B01J 19/1837* (2013.01); *B01J 19/1862* (2013.01); *B01J 19/2455* (2013.01); *C08F 210/16* (2013.01); *B01J 2219/24* (2013.01) ;

(58) Field of Classification Search
CPC ............... B01J 10/1837; B01J 19/2455; B01J 19/1862; B01J 2219/24; B01J 8/007; C08F 2/01; C08F 210/16; C08F 10/02; C08F 2/14; C08F 210/14
USPC ..................................... 526/64, 348; 422/132
See application file for complete search history.

(56) References Cited

U.S. PATENT DOCUMENTS 3,293,000 A    12/1966  Marwil
6,864,207 B2    3/2005  Knoeppel et al.
6,930,071 B2    8/2005  Knoeppel et al.

FOREIGN PATENT DOCUMENTS

CN    100475851 C    4/2009
CN    101955554 A    1/2011
(Continued)

OTHER PUBLICATIONS

Newitt, D. M., Richardson, J. F., M. Abbott, & Turtle, R. B. (1955). Hydraulic conveying of solids in horizontal pipes. Trans Inst. of Chem. Eng., 33, 93-113.
(Continued)

*Primary Examiner* — William Cheung

(57) ABSTRACT

A process for preparing polyolefin in a polymerization loop reactor can include feeding olefin monomer, liquid diluent, polymerization catalyst, optionally hydrogen, and optionally olefin co-monomer into the polymerization loop reactor. The process can include polymerizing the olefin monomer and optionally the olefin co-monomer to produce a polyolefin slurry in the polymerization loop reactor. The polymerization loop reactor can include a plurality of interconnected pipes defining a flow path for the polyolefin slurry. The polymerization loop reactor can include one or more settling legs provided on at least one horizontal part of the interconnected pipes. The circulation velocity of the polyolefin slurry inside at least one horizontal part of the interconnected pipes provided with one or more settling legs can be reduced by at least 20% and at most 60% compared to a circulation velocity inside a remainder of the polymerization loop reactor.

18 Claims, 1 Drawing Sheet

(51) Int. Cl.
  *B01J 19/18* (2006.01)
  *C08F 2/01* (2006.01)
  *B01J 8/00* (2006.01)
  *B01J 19/24* (2006.01)
  *C08F 210/16* (2006.01)

(56) References Cited

FOREIGN PATENT DOCUMENTS

| WO | 01/05842 A1 | 1/2001 |
|---|---|---|
| WO | 2004/024781 A1 | 3/2004 |
| WO | 2004024780 A1 | 3/2004 |
| WO | 2004027264 A2 | 4/2004 |
| WO | 2005/028097 A1 | 3/2005 |
| WO | 2005/077985 A2 | 8/2005 |
| WO | 2005/079967 A1 | 9/2005 |
| WO | WO 2011/051367 A1 * | 5/2011 |

OTHER PUBLICATIONS

Spells, K. E. (1955). Correlations for use in transport of aqueous suspensions of fine solids through pipes. Institution of Chemical Engineers—Transactions, 33(2), 79-84.

Govier, G.W., and Charles, M.E., "The Hydraulics of the Pipeline Flow of Solid—Liquid Mixtures," Engineering J., 44, 8, pp. 50-57, Aug. 1961.

Edward J. Wasp Et Al., Solid-Liquid Flow Slurry Pipeline Transportation 89 (Trans Tech Publications 1977) (1977).

International Search Report issued in International Application No. PCT/EP2013/059217, dated Jun. 27, 2013 (2 pages).

Office Action issued in Chinese Application No. 201380023277.X, dated May 5, 2015, 18 pages.

* cited by examiner

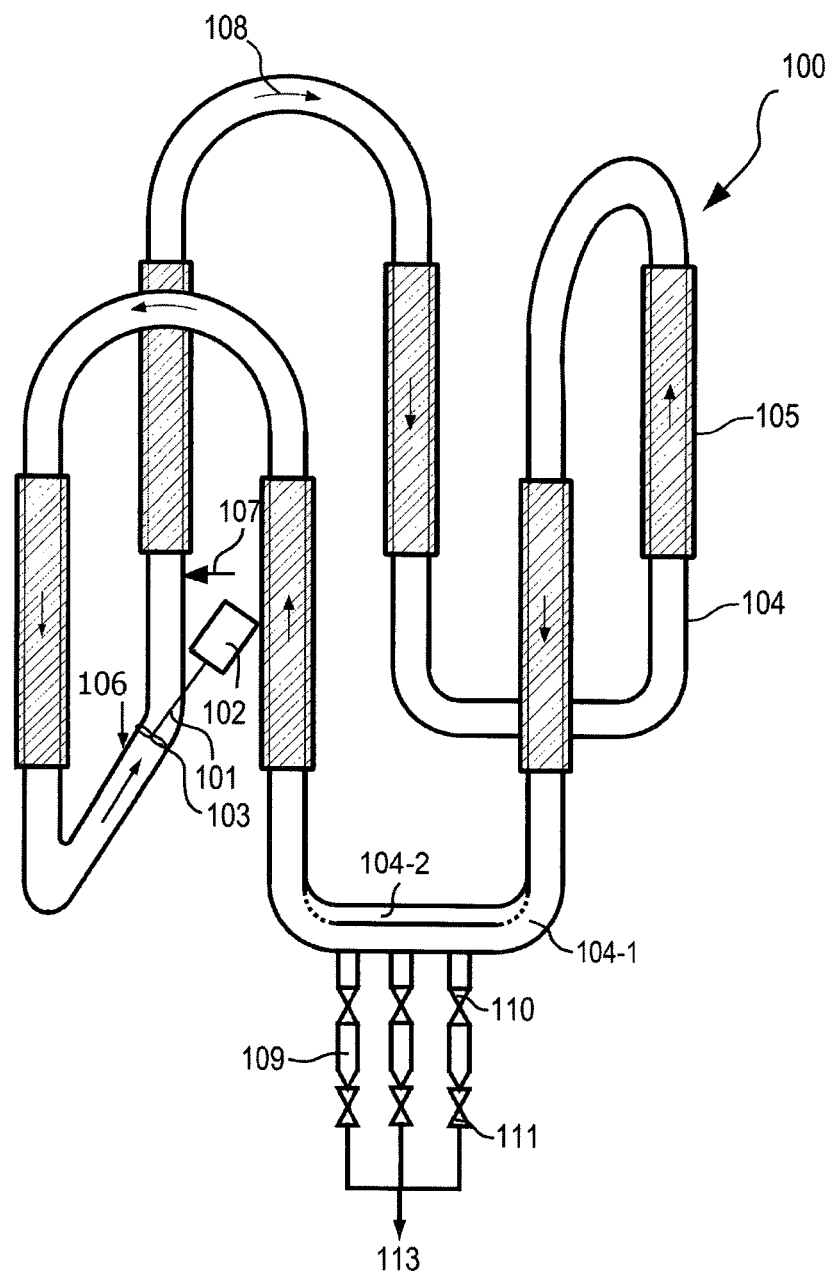

PROCESS FOR PREPARING A POLYETHYLENE PRODUCT IN A POLYMERIZATION LOOP REACTOR

CROSS REFERENCE TO RELATED APPLICATIONS

This application is a national stage entry of PCT/EP2013/059217, filed on May 3, 2013, which claims priority from European Application No. 12166881.8, filed on May 4, 2012.

FIELD OF THE INVENTION

The present invention relates to a process for the preparation of a polyethylene product. In particular, the present invention relates to improvements in the removal of a polyethylene slurry from a polymerization loop reactor. The present invention relates as well to a loop reactor for polyethylene polymerization with improved product removal means.

BACKGROUND OF THE INVENTION

Polyolefins, such as polyethylene (PE), are synthesized by polymerizing monomers, such as ethylene ($CH_2=CH_2$). Because they are cheap, safe and stable to most environments and easy to be processed, polyolefins are useful in many applications. Polyethylene can be classified into several types, such as, but not limited to, LDPE (Low Density Polyethylene), LLDPE (Linear Low Density Polyethylene), and HDPE (High Density Polyethylene) as well as High Molecular Weight (HMW), Medium Molecular Weight (MMW) and Low Molecular Weight (LMW). Each type of polyethylene has different properties and characteristics.

Olefin (such as ethylene) polymerizations are frequently carried out in a loop reactor using monomer (such as ethylene), diluent and catalyst, optionally an activating agent, optionally one or more co-monomer(s), and optionally hydrogen.

Polymerization in a loop reactor is usually performed under slurry conditions, with the produced polymer usually in a form of solid particles suspended in diluent. The slurry is circulated continuously in the reactor with a pump to maintain efficient suspension of the solid polymer particles in the liquid diluent. Polymer slurry is discharged from the loop reactor by means of settling legs. Settling in the legs is used to increase the solid concentration of the slurry finally recovered as product slurry. The product slurry is further discharged through heated flash lines to a flash tank, where most of the diluent and unreacted monomers are flashed off and recycled. The polymer particles are dried, additives can be added and finally the polymer may be extruded and pelletized.

Optimal behavior of the settling legs is reached when the quantity of recovered solid polymer is maximized with respect to the amount of fluid effluent that must be recycled, so that the recycling cost may be minimized for a given production rate. The use of settling legs, however, results only in a minor increase in the concentration of solid polymer withdrawn form the polymerization loop reactor.

Various alternative product removal techniques are known. For example, by means of a continuous product take off, more in particular by means of an elongated hollow appendage provided on the reactor, said hollow appendage being in direct fluid communication with a heated flash line and thus being adapted for continuous removal of product slurry.

WO 2004/024781 describes a slurry polymerization process which removes a portion of the fluid slurry without using a settling leg or a continuous take-off. The process uses a reactor take-off valve that is periodically fully closed and fully opened such that the withdrawn slurry is removed from the reactor in a discontinuous manner.

WO 01/05842 describes an apparatus for removing concentrated slurry from a flowing stream of slurry in a conduit characterized by a channel in an outlet area of the conduit, the outlet being adapted to continuously remove slurry.

The above-described known processes and apparatuses have the disadvantage that the product slurry withdrawn from the reactor still contains a large amount of diluent and other reactants, such as monomer, which implies the necessity to subsequently separate them from the solid polymer particles and to reprocess them for the purpose of reusing them in the reactor.

There remains a need in the art for an improved polyolefin production process. It is an object of the present invention to provide an improved polyethylene preparation process, wherein the product slurry withdrawn from the reactor contains an increased concentration of solid polymer particles and a decreased concentration of diluent and other reactants, such as monomer. It is further an object of the present invention to provide a loop reactor having improved operating conditions.

SUMMARY OF THE INVENTION

The present inventors have found a way to improve polyolefin preparation processes and overcome at least one of the above-mentioned problems of the prior art.

In a first aspect, the present invention relates to a process for preparing polyolefin in a polymerization loop reactor, said loop reactor comprising: a plurality of interconnected pipes defining a flow path for a polyolefin slurry, and one or more settling legs provided on at least one horizontal part of said interconnected pipes, said method comprising the steps of: feeding olefin monomer, liquid diluent, polymerization catalyst, optionally hydrogen, and optionally olefin co-monomer into said loop reactor; and polymerizing said monomer and said optionally co-monomer to produce a polyolefin slurry in said loop reactor; wherein the circulation velocity of the polyolefin slurry inside said at least one horizontal part of said interconnected pipes provided with one or more settling legs is reduced by at least 20% and at most 60%, compared to the circulation velocity inside the remainder of said loop reactor.

The inventors have surprisingly found that the above-provided process creates a stratification of the polyolefin slurry inside said at least one horizontal part of said interconnected pipes provided with one or more settling legs. This stratification has the advantage of increasing the solid polymer concentration in the bottom part of said at least one horizontal part of the pipe provided with one or more settling legs. Consequently and advantageously, the polyolefin slurry withdrawn from the loop reactor will contain an increased amount of solid polymer and a decreased amount of diluent and other reactants, such as monomer. This is advantageous because the process minimizes or obviates the need for elaborate downstream processing of the polyolefin slurry. As a further advantage, the cost of production will be decreased because less monomer and diluent will be fed to the separation and purification processes. The concentration in polymer solids in the stratified flow can be at most 10 wt % higher than the concentration in the main flow in other reactor sections with no stratification. The concentration in polymer solids in the densest part of the stratified flow can be between 45 wt % to 60 wt %, ideally between 55 wt % and 60 wt %.

In a second aspect, the present invention relates to a loop reactor suitable for a polyolefin polymerization process comprising a plurality of interconnected pipes defining a flow path for a polyolefin slurry, means for introducing olefin monomer, polymerization catalyst and diluent into said reactor, one or more settling legs provided on at least one horizontal part of said interconnected pipes, and a pump suitable for maintaining said polyolefin slurry in circulation in said loop reactor, wherein the bottom ends of at least two vertical pipes are connected to each other by two horizontal pipes, and wherein at least one of said two horizontal pipes is provided with one or more settling legs. Preferably, the present invention provides a loop reactor suitable for a polyolefin polymerization process comprising: a plurality of interconnected pipes defining a flow path for a polyolefin slurry, means for introducing olefin monomer, polymerization catalyst and diluent into said reactor, one or more settling legs provided on at least one horizontal part of said interconnected pipes, and a pump suitable for maintaining said polyolefin slurry in circulation in said loop reactor; wherein the bottom ends of at least two vertical pipes are connected to each other by two horizontal pipes, and wherein at least one of said two horizontal pipes is provided with one or more settling legs, and wherein said two horizontal pipes are configured to reduce the circulation velocity of the polyolefin slurry inside at least one horizontal part of said interconnected pipes provided with one or more settling legs by at least 20% and at most 60% compared to the circulation velocity inside the remainder of said loop reactor.

The present invention provides advantages over the prior art. A loop reactor as described above, significantly increases the efficiency of the settling legs, resulting in a product slurry withdrawn from the loop reactor with a higher solid polymer concentration and a lower concentration of diluent and other reactants, such as monomer. Therefore, the loop reactor is advantageous for obtaining product slurry in an efficient and hence economical way.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The description is only given by way of example and does not limit the invention. The reference numbers relate to the hereto-annexed figure.

BRIEF DESCRIPTION OF THE DRAWINGS

FIG. 1 represents a schematic perspective view of a loop reactor according to an embodiment of the present invention.

DETAILED DESCRIPTION OF THE INVENTION

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" or "another embodiment" means that a particular configuration or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the following detailed description of the invention, reference is made to the accompanying drawings that form a part hereof, and in which are shown by way of illustration only of specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention provides a process for preparing polyolefin in a polymerization loop reactor, said loop reactor comprising:
  a plurality of interconnected pipes defining a flow path for a polyolefin slurry, and
  one or more settling legs provided on at least one horizontal part of said interconnected pipes,
    said process comprising the steps of:
    feeding olefin monomer, liquid diluent, polymerization catalyst, optionally hydrogen, and optionally olefin co-monomer into said loop reactor; and
    polymerizing said olefin monomer and said optionally co-monomer to produce said polyolefin slurry in said loop reactor;
wherein the circulation velocity of the polyolefin slurry inside at least one horizontal part of said interconnected pipes provided with one or more settling legs is reduced by at least 20% and at most 60% compared to the circulation velocity inside the remainder of said loop reactor.

As used herein the term "horizontal part" refers to a substantially horizontal section of a pipe. The horizontal part can therefore be U shaped or substantially straight.

The process is particularly useful in an alpha-olefin polymerization reactor wherein the polymerization is performed under high pressure, and more especially into slurry reactor. The case of ethylene is exemplified, but in a non limitative manner.

According to an embodiment, a slurry is preferably prepared by feeding reactants to a loop reactor having one or more loops and comprising on at least one of the one or more loops, one or more settling legs; and polymerizing monomer to produce polyolefin (preferably polyethylene) slurry comprising diluent and solid polyolefin (preferably polyethylene)

particles. Said reactants preferably include diluent, monomers, catalyst, optionally hydrogen, optionally one or more co-monomers.

As used herein, the term "monomer" refers to olefin compound that is to be polymerized. Examples of olefin monomers are ethylene and propylene. Preferably, the invention is directed to ethylene. The present invention is particularly suitable for polymerization process for preparing polyethylene.

Suitable "ethylene polymerization" includes but is not limited to homopolymerization of ethylene or copolymerization of ethylene and at least one olefin co-monomer. Ethylene polymerizes in a liquid diluent in the presence of a catalyst, optionally an activating agent, optionally a co-monomer, optionally hydrogen and optionally other additives, thereby producing polymerization slurry.

The present process for preparing polyolefin may include a process for preparing monomodal or bimodal polyolefin.

By the term "monomodal polyolefin" or "polyolefin with a monomodal molecular weight distribution" it is meant, polymers having one maximum in their molecular weight distribution curve defined also as unimodal molecular weight distribution curve. By the term "polyolefin with a bimodal molecular weight distribution" or "bimodal polyolefin" it is meant, polyolefin having a distribution curve being the sum of two unimodal molecular weight distribution curves. By the term "polyolefin with a multimodal molecular weight distribution" or "multimodal" polyolefin it is meant polymers with a distribution curve being the sum of at least two, preferably more than two unimodal molecular weight distribution curves.

Olefin co-monomers which are suitable for being used in accordance with the present invention comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. The term "co-polymer" refers to a polymer, which is made by linking two different types of monomer in the same polymer chain. The term "homo-polymer" refers to a polymer which is made by linking identical monomers, in the absence of co-monomers. In an embodiment of the present invention, said co-monomer is 1-hexene.

As used herein, the term "diluent" refers to diluents in liquid form that is in a liquid state, liquid at room temperature and preferably liquid under the pressure conditions in the loop reactor. Diluents which are suitable for being used in accordance with the present invention may comprise, but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

As used herein, the terms "polyolefin slurry", "polymerization slurry" or "polymer slurry" or "slurry" means substantially a multi-phase composition including at least solid polymer particles and a liquid phase, the liquid phase being the continuous phase. The solids include catalyst and a polymerized olefin, such as polyethylene. The liquids may comprise an inert diluent, such as isobutane, dissolved monomer such as ethylene, optional co-monomer(s), molecular weight control agents, such as hydrogen, one or more antistatic agents, antifouling agents, scavengers, and other process additives.

The polymerization reaction may utilize catalyst that initiate polymerization and propagate the reaction. As used herein, the term "catalyst" refers to a substance that causes a change in the rate of a polymerization reaction. In the present invention it is especially applicable to ethylene polymerization catalysts such as metallocene catalysts, Ziegler-Natta catalysts and/or chromium catalysts.

The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclo-pentadienyl, indenyl, fluorenyl or their derivatives. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

$$(Ar)_2MQ_2 \qquad \qquad (I); or$$

$$R''(Ar)_2MQ_2 \qquad \qquad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;

wherein M is a transition metal M selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl)zirconium dichloride ($Cp_2ZrCl_2$), bis(cyclopentadienyl)titanium dichloride ($Cp_2TiCl_2$), bis(cyclopentadienyl)hafnium dichloride ($Cp_2HfCl_2$); bis(tetrahydroindenyl)zirconium dichloride, bis (indenyl)zirconium dichloride, and bis(n-butyl-cyclopentadienyl)zirconium dichloride; ethylenebis(4,5,6,7-tetrahydro-1-indenyl)zirconium dichloride, ethylenebis(1-indenyl) zirconium dichloride, dimethylsilylene bis(2-methyl-4-phenyl-inden-1-yl)zirconium dichloride, diphenylmethylene (cyclopentadienyl)(fluoren-9-yl)zirconium dichloride, and dimethylmethylene [1-(4-tert-butyl-2-methyl-cyclopentadienyl)](fluoren-9-yl)zirconium dichloride.

The metallocene catalysts are preferably provided on a solid support. The support can be an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support. In an embodiment, the catalyst for use in the present process is a supported metallocene-alumoxane catalyst consisting of a metallocene and an alumoxane which are bound on a porous silica support.

The term "Ziegler-Natta catalyst" or "ZN catalyst" refers to catalysts having a general formula $M^1X_v$, wherein $M^1$ is a transition metal compound selected from group IV to VII, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use in the invention are described in U.S. Pat. Nos. 6,930,071 and 6,864,207, which are incorporated herein by reference.

The term "chromium catalysts" refers to catalysts obtained by deposition of chromium oxide on a support, e.g. silica or aluminium support. Illustrative examples of chromium catalysts comprise but are not limited to $CrSiO_2$ or $CrAl_2O_3$.

Optionally, activating agent is used in processes according to the invention. The term "activating agent" refers to materials that can be used in conjunction with a catalyst in order to improve the activity of the catalyst during the polymerization reaction. In the present invention, it particularly refers to an organo-aluminium compound, being optionally halogenated, having general formula $AlR^{11}R^{12}R^{13}$ or $AlR^{11}R^{12}Y$, wherein $R^{11}$, $R^{12}$, $R^{13}$ is an alkyl having from 1 to 6 carbon atoms and $R^{11}$, $R^{12}$, $R^{13}$ may be the same or different and wherein Y is hydrogen or a halogen, as disclosed in U.S. Pat. Nos. 6,930, 071 and 6,864,207, which are incorporated herein by reference. Preferred activating agents are Tri-Ethyl Aluminum (TEAl), Tri-Iso-Butyl Aluminum (TIBAl), Tri-Methyl Aluminum (TMA), and Methyl-Methyl-Ethyl Aluminum (MMEAl). TEAl is particularly preferred. In an embodiment, the activating agent is added to the loop reactor in an activating agent slurry at a concentration of less than 90% by weight of the activating agent slurry composition, more preferably from 10% to 50% by weight, for instance around 20% by weight.

The polymerization can be performed over a wide temperature range. Preferably, the temperature is within the range of about 0° C. to about 110° C. A more preferred range is from about 60° C. to about 110° C., more preferably from about 80° C. to 110° C. The reactor pressure can be held between 20 and 100 bar, preferably from 30 to 50 bar, more preferably at pressure of 37 to 45 bar.

The present process uses a loop reactor comprising: a plurality of interconnected pipes defining a flow path for a polyolefin slurry, and one or more settling legs provided on at least one horizontal part of said interconnected pipes; wherein the circulation velocity of the polyolefin slurry inside at least one horizontal part of said interconnected pipes provided with one or more settling legs is at least 20% and at most 60% slower than the circulation velocity inside the remainder of said loop reactor, said process comprising the steps of:

feeding olefin monomer, liquid diluent, polymerization catalyst, optionally hydrogen, and optionally olefin co-monomer into said loop reactor; and polymerizing said olefin monomer and said optionally co-monomer to produce said polyolefin slurry in said loop reactor.

In an embodiment, the internal diameter of said at least one horizontal part of said interconnected pipes provided with one or more settling legs is increased by a factor of at most 1.40 compared to the internal diameter of the remainder of said interconnected pipes.

In an alternative embodiment, the bottom ends of at least two vertical pipes are connected to each other by two horizontal pipes, and wherein at least one of said two horizontal pipes is provided with one or more settling legs. Preferably, both of said two horizontal pipes are provided with one or more settling legs. In some embodiments, the internal diameter of at least one of said two horizontal pipes provided with one or more settling legs can be decreased by a factor of at most 0.9 compared to the internal diameter of the remainder of said interconnected pipes. As used herein, "internal diameter decreased by a factor of at most 0.9" refers to an internal diameter which is at most 10% smaller than the internal diameter of the remainder of said interconnected pipes. Preferably, the internal diameter of at least one of said two horizontal pipes provided with one or more settling legs is equal to 0.90 to 1.0 times the internal diameter of the remainder of said interconnected pipes. For example, the internal diameter of at least one of said two horizontal pipes provided with one or more settling legs is equal to 0.90 to 0.99 times the internal diameter of the remainder of said interconnected pipes, for example equal to 0.90 to 0.98 times the internal diameter of the remainder of said interconnected pipes, for example equal to 0.90 to 0.96 times the internal diameter of the remainder of said interconnected pipes, for example equal to 0.90 to 0.95 times the internal diameter of the remainder of said interconnected pipes. Preferably, the internal diameter of both (each) of said two horizontal pipes provided with one or more settling legs is decreased by a factor of at most 0.9 compared to the internal diameter of the remainder of said interconnected pipes. Preferably, the internal diameter of each of said two horizontal pipes provided with one or more settling legs is equal to 0.90 to 1.0 times the internal diameter of the remainder of said interconnected pipes. For example, the internal diameter of each of said two horizontal pipes provided with one or more settling legs is equal to 0.90 to 0.99 times the internal diameter of the remainder of said interconnected pipes; for example, the internal diameter of each of said two horizontal pipes provided with one or more settling legs is equal to 0.90 to 0.98 times the internal diameter of the remainder of said interconnected pipes; for example, the internal diameter of each of said two horizontal pipes provided with one or more settling legs is equal to 0.90 to 0.96 times the internal diameter of the remainder of said interconnected pipes; for example, the internal diameter of each of said two horizontal pipes provided with one or more settling legs is equal to 0.90 to 0.95 times the internal diameter of the remainder of said interconnected pipes.

The reactor can be a single loop or a double loop comprising two serially connected loop reactors. The reactor can be a multiple loop reactors, comprising at least 3 loop reactors connected in series.

The present invention also encompasses a process for the preparation of polyolefin in a polymerization loop reactor comprising: a plurality of interconnected pipes defining a flow path for a polyolefin slurry, and one or more settling legs provided on at least one horizontal part of said interconnected pipes; wherein the internal diameter of said at least one horizontal part provided with one or more settling legs is increased by a factor of at most 1.40 compared to the internal diameter of the remainder of said interconnected pipes, said process comprising the steps of:
feeding olefin monomer, liquid diluent, polymerization catalyst, optionally hydrogen, and optionally olefin co-monomer into said loop reactor; and
polymerizing said olefin monomer and said optionally co-monomer to produce said polyolefin slurry in said loop reactor.

The present invention also encompasses a process for the preparation of polyolefin in a polymerization loop reactor comprising: a plurality of interconnected pipes defining a flow path for a polyolefin slurry, and one or more settling legs provided on at least one horizontal part of said interconnected pipes; wherein the bottom ends of at least two vertical pipes are connected to each other by two horizontal pipes, and wherein at least one of said two horizontal pipes is provided with one or more settling legs; said process comprising the steps of:
feeding olefin monomer, liquid diluent, polymerization catalyst, optionally hydrogen, and optionally olefin co-monomer into said loop reactor; and
polymerizing said olefin monomer and said optionally co-monomer to produce said polyolefin slurry in said loop reactor.

In a preferred embodiment, the present invention provides a process for preparing a polyolefin product in a polymerization loop reactor, said loop reactor comprising: a plurality of interconnected pipes defining a flow path for a polyolefin slurry, means for introducing olefin monomer, polymerization catalyst and diluent into said loop reactor, one or more settling legs provided on at least one horizontal part of said interconnected pipes, and a pump suitable for maintaining the polyolefin slurry in circulation in said loop reactor, said process comprising the steps of: feeding olefin monomer, liquid diluent, polymerization catalyst, optionally hydrogen, and optionally olefin co-monomer into said loop reactor; polymerizing said monomer and said optionally co-monomer to produce a polyolefin slurry in said loop reactor; allowing said polyolefin slurry to settle into one or more settling legs connected to said loop reactor; discontinuously withdrawing said polyolefin slurry from one or more settling legs out of said loop reactor; wherein the circulation velocity of said polyolefin slurry inside said at least one horizontal part provided with one or more settling legs is at least 20% and at most 60% slower than the circulation velocity inside the remainder of said loop reactor, preferably at least 30% and at most 55% slower than the circulation velocity inside the remainder of said loop reactor.

In an embodiment, the circulation velocity of the polyolefin slurry inside said at least one horizontal part provided with one or more settling legs ranges between the limit homogeneous velocity and the limit deposition velocity.

The term "limit homogeneous velocity" ($V_{LH}$) generally refers to a velocity of the polymer slurry in a horizontal part of the interconnected pipes above which the polymer slurry is fully homogeneous and the solids concentration is constant throughout the pipe section.

The limit homogeneous velocity can be expressed as:

$V_{LH} = (1800 g D V_\infty)^{1/3}$ according to Newitt, D. M., Richardson, J. F., M. Abbott, & Turtle, R. B. (1955). Hydraulic conveying of solids in horizontal pipes. *Trans Inst. of Chem. Eng.*, 33, 93-113.

or $V_{LH} = 134 C_D^{0.816} D^{0.633} V_\infty^{1.63}$ according to Spells, K. E. (1955). Correlations for use in transport of aqueous suspensions of fine solids through pipes. *Institution of Chemical Engineers—Transactions*, 33 (2), 79-84. With D being in ft and V∞ in ft/s.

or $V_{LH} = 11.9 d_p^{-1/4} (V_\infty D)^{0.5}$ according to Govier, G. W., and Charles, M. E., "The Hydraulics of the Pipeline Flow of Solid-Liquid Mixtures," Engineering J., 44, 8, pp. 50-7, August, 1961.

wherein
V∞ Solid particle terminal velocity, m/s==SQRT(4*g*$d_p$*(S−1)/(3*$C_D$))
$C_D$ Drag coefficient, —=24/$Re_p$*(1+0.15*$Re_p$^0.687)
$Re_p$ Particle Reynolds number, —=rho_L*$d_p$*V∞/μ_L
S Density ratio, —=rho_S/rho_L
rho_S Particle solid density, kg/m³
rho_L Liquid density, kg/m³
D Pipe diameter, m
$d_p$ Particle diameter, m
g Gravitational acceleration, m²/s The term "limit deposition velocity" ($V_{LD}$) generally refers to a velocity of the polymer slurry in a horizontal part of the interconnected pipes at which the solid polymer particles of the polymer slurry start to be deposited out of the main flow of slurry in the loop reactor. The limit deposition velocity represents a minimum circulation velocity for a loop reactor.

The limit deposition velocity can be expressed as:

$$V_D = F_L \left[ 2gD \left( \frac{\rho_p - \rho_i}{\rho_i} \right) \right]^{1/2} \qquad (1)$$

(EDWARD J. WASP ET AL., SOLID-LIQUID FLOW SLURRY PIPELINE TRANSPORTATION 89 (Trans Tech Publications 1977) (1977), wherein $V_D$ is the limit deposition velocity, $F_L$ is an empirical constant that generally increases with increasing solids concentration and increasing particle size, g is gravitational acceleration (32.2 ft/sec$^2$ or 9.81 m/s$^2$), $\rho_p$ is the polymer particle density, $\rho_i$ is the liquid medium density, and D is the reactor internal diameter. The limit deposition velocity represents a minimum circulation velocity for a loop reactor.

In an embodiment, the loop reactor suitable for use in the present process comprises a plurality of interconnected pipes defining a flow path for a polyethylene slurry, means for introducing ethylene monomer, polymerization catalyst and diluent into the loop reactor, one or more settling legs provided on at least one horizontal part of said interconnected pipes, and a pump suitable for maintaining the polyethylene slurry in circulation in said loop reactor.

In an embodiment, the polymerization process comprises the steps of feeding ethylene monomer, liquid diluent, polymerization catalyst, optionally hydrogen, and optionally olefin co-monomer into said loop reactor; polymerizing said monomer and said optionally co-monomer to produce a polyethylene slurry in said loop reactor; allowing polyethylene slurry to settle into one or more settling legs connected to said loop reactor; discontinuously withdrawing said polyethylene slurry from one or more settling legs out of said loop reactor.

According to an embodiment, the circulation velocity of the polyethylene slurry inside said at least one horizontal part provided with one or more settling legs can be reduced by at least 20% and at most 60%, for example by at least 30% and at most 59%, for example by at least 40% and at most 58%, for example by at least 50% and at most 57%, for example by at least 50% and at most 56%, for example by at least 50% and at most 55%, preferably, the velocity is reduced by at least 35% and at most 55%, preferably by at least 35% and at most 50%, preferably by at least 40% and at most 50%, preferably by at least 40% and at most 45%, compared to the circulation velocity inside the remainder of said loop reactor. According to a preferred embodiment, the circulation velocity of the polyethylene slurry inside said at least one horizontal part provided with one or more settling legs is ranging from 40% to 80% of the circulation velocity inside the remainder of said loop reactor, for example ranging from 45% to 75%, for example ranging from 50% to 70%, for example ranging from 50% to 65%, for example ranging from 50% to 60%, for example ranging from 55% to 60% of the circulation velocity inside the remainder of said loop reactor.

In an embodiment, the circulation velocity of the polyethylene slurry inside said at least one horizontal part provided with one or more settling legs may be ranging between 4 and 6 m/s, for example 5m/s and the circulation velocity inside the remainder of said loop reactor may be ranging between 7 and 10 m/s, for example 9m/s. Preferably, the circulation velocity of the polyolefin slurry inside at least one horizontal part of said interconnected pipes provided with one or more settling legs is ranging from 4 to 7 m/s, for example from 4 m/s to 6 m/s and the circulation velocity inside the remainder of said loop reactor is ranging from 7 to 11 m/s, for example from 8 to 10 m/s.

In an embodiment, the polymerization is performed in one loop reactor comprising a plurality of interconnected pipes defining a flow path for a polyethylene slurry, and further comprises one or more settling legs provided on at least one horizontal part of said interconnected pipes, wherein the internal diameter of said at least one horizontal part provided with one or more settling legs is increased by a factor of at most 1.40 compared to the internal diameter of the remainder of said interconnected pipes. In an embodiment, the internal diameter of the horizontal part provided with one or more settling legs is increased by a factor of at least 1.10 and at most 1.50, for example of at least 1.10 and at most 1.40, for example at least 1.15 and at most 1.39, for example at least 1.20 and at most 1.38, for example at least 1.25 and at most 1.37, for example at least 1.30 and at most 1.36, for example at least 1.30 and at most 1.35, compared to the internal diameter of the remainder of said interconnected pipes. In an embodiment, the internal diameter of said horizontal part provided with one or more settling legs is equal to 1.10 to 2.0 times the internal diameter of the remainder of the loop reactor pipes, for example is equal to 1.10 to 1.50 times the internal diameter of the remainder of the loop reactor pipes, for example is equal to 1.2 to 1.4 times the internal diameter of the remainder of the loop reactor pipes, for example is equal to 1.40 times the internal diameter of the remainder of the loop reactor pipe, for example 1.39, for example 1.38, for example 1.37, for example 1.36, for example 1.35, preferably 1.34 times the internal diameter of the remainder of the loop reactor pipes.

In another embodiment, the polymerization is performed in one loop reactor comprising a plurality of interconnected pipes defining a flow path for a polyethylene slurry, and one or more settling legs provided on at least one horizontal part of said interconnected pipes, wherein the bottom ends of at least two vertical pipes are connected to each other by two horizontal pipes, and wherein at least one of said two horizontal pipes is provided with one or more settling legs. In a preferred embodiment, the polymerization is performed in one loop reactor comprising a plurality of interconnected pipes defining a flow path for a polyethylene slurry, and one or more settling legs provided on at least one horizontal part of said interconnected pipes, wherein the bottom ends of at least two vertical pipes are connected to each other by two horizontal pipes, each one with a diameter decreased by a factor of about 0.90 to 1.0, preferably about 0.95 compared to the diameter of the remainder of the reactor, and wherein at least one of said two horizontal pipes is provided with one or more settling legs. In some preferred embodiments, the polymerization is performed in one loop reactor comprising a plurality of interconnected pipes defining a flow path for a polyethylene slurry, and one or more settling legs provided on at least one horizontal part of said interconnected pipes, wherein the bottom ends of at least two vertical pipes are connected to each other by two horizontal pipes, each one with an internal diameter equal to 0.90 to 1.0 times the internal diameter of the remainder of the reactor, and wherein at least one of said two horizontal pipes is provided with one or more settling legs. Preferably, each one has an internal diameter equal to 0.90 to 0.98 times the internal diameter of the remainder of said interconnected pipes; for example, each one has an internal diameter equal to 0.90 to 0.96 times the internal diameter of the remainder of said interconnected pipes; for example, each one has an internal diameter equal to 0.90 to 0.95 times the internal diameter of the remainder of said interconnected pipes.

In an embodiment, said polymerization loop reactor is a single slurry loop reactor. In another embodiment, said polymerization loop reactor is a double slurry loop reactor comprising two serially connected loop reactors.

In an embodiment, the process can be performed in a double loop reactor comprising a first and a second serially connected loop reactors, each reactor comprising a plurality of interconnected pipes defining a flow path for a polyethylene slurry, wherein the second reactor comprises one or more settling legs provided on at least one horizontal part of the interconnected pipes, wherein the internal diameter of the at least one horizontal part provided with one or more settling legs is increased by a factor of at most 1.40 compared to the internal diameter of the remainder of the interconnected pipes.

In an embodiment, the process can be performed in a double loop reactor comprising a first and a second serially connected loop reactors, each reactor comprising a plurality of interconnected pipes defining a flow path for a polyethylene slurry, wherein in the second reactor the bottom ends of at least two vertical pipes are connected to each other by two horizontal pipes, and wherein at least one of said two horizontal pipes is provided with one or more settling legs. In an embodiment, the process can be performed in a double loop reactor consisting of a first and a second serially connected loop reactors, each reactor comprising a plurality of interconnected pipes defining a flow path for a polyethylene slurry, wherein in the second reactor the bottom ends of at least two vertical pipes are connected to each other by two horizontal pipes, and wherein at least one of said two horizontal pipes is provided with one or more settling legs. In an embodiment, the internal diameter of at least one or both of said two horizontal pipes provided with one or more settling legs is decreased by a factor of at most 0.9, for example at most 0.91, for example at most 0.92, for example at most 0.93, for example at most 0.94, preferably at most by a factor of 0.95 compared to the internal diameter of the remainder of said interconnected pipes. In an embodiment, the internal diameter of at least one or both of said two horizontal pipes provided with one or more settling legs is decreased by a factor of about 0.90 to 1.0, preferably about 0.95 compared to the internal diameter of the remainder of said interconnected pipes. Preferably, the internal diameter of at least one or both of said two horizontal pipes provided with one or more settling legs is equal to 0.90 to 1.0 times the internal diameter of the remainder of said interconnected pipes. For example, the internal diameter of at least one of said two horizontal pipes provided with one or more settling legs is equal to 0.90 to 0.99 times the internal diameter of the remainder of said interconnected pipes, for example equal to 0.90 to 0.98 times the internal diameter of the remainder of said interconnected pipes, for example equal to 0.90 to 0.96 times the internal diameter of the remainder of said interconnected pipes, for example equal to 0.90 to 0.95 times the internal diameter of the remainder of said interconnected pipes.

The present invention encompasses all the above described double loop reactors.

The present invention also encompasses a loop reactor, said loop reactor comprising a plurality of interconnected pipes defining a flow path for a polyolefin slurry, means for introducing olefin monomer, polymerization catalyst and diluent into said reactor, one or more settling legs provided on at least one horizontal part of said interconnected pipes, and a pump suitable for maintaining said polyolefin slurry in circulation in said loop reactor, wherein the bottom ends of at least two vertical pipes are connected to each other by two horizontal pipes, and wherein at least one of said two horizontal pipes is provided with one or more settling legs, and wherein said two horizontal pipes are configured to reduce the circulation velocity of the polyolefin slurry inside at least one horizontal part of said interconnected pipes provided with one or more settling legs by at least 20% and at most 60% compared to the circulation velocity inside the remainder of said loop reactor.

According to an embodiment, the two horizontal pipes can be configured to reduce the circulation velocity of the polyolefin slurry inside at least one horizontal part of said interconnected pipes provided with one or more settling legs by at least 25% and at most 60%, for example by at least 30% and at most 60%, preferably, the velocity is reduced by at least 35% and at most 55%, preferably by at least 35% and at most 50%, preferably by at least 40% and at most 50%, preferably by at least 40% and at most 45% compared to the circulation velocity inside the remainder of said loop reactor.

According to a preferred embodiment, the two horizontal pipes can be configured so that the circulation velocity of the polyolefin slurry inside at least one horizontal part of said interconnected pipes provided with one or more settling legs is ranging from 40% to 80% of the circulation velocity inside the remainder of said loop reactor, for example ranging from 45% to 75%, for example ranging from 50% to 70%, for example ranging from 50% to 65%, for example ranging from 50% to 60%, for example ranging from 55% to 60% of the circulation velocity inside the remainder of said loop reactor.

In an embodiment, the two horizontal pipes can be configured so that the circulation velocity of the polyolefin slurry inside at least one horizontal part of said interconnected pipes provided with one or more settling legs is ranging from 4 to 7 m/s, for example from 4 m/s to 6 m/s and the circulation velocity inside the remainder of said loop reactor is ranging from 7 to 11 m/s, for example from 8 to 10 m/s.

In an embodiment, both of said two horizontal pipes are provided with one or more settling legs. In an embodiment, the internal diameter of at least one or both of said two horizontal pipes provided with one or more settling legs is decreased by a factor of about 0.90 to 1.0; for example a factor of about 0.90 to 0.98; for example a factor of about 0.90 to 0.97; for example a factor of about 0.90 to 0.96; for example a factor of about 0.90 to 0.95; preferably about 0.95 compared to the internal diameter of the remainder of said interconnected pipes. Preferably, the internal diameter of at least one or both of said two horizontal pipes provided with one or more settling legs is equal to 0.90 to 1.0 times the internal diameter of the remainder of said interconnected pipes. For example, the internal diameter of at least one of said two horizontal pipes provided with one or more settling legs is equal to 0.90 to 0.99 times the internal diameter of the remainder of said interconnected pipes, for example equal to 0.90 to 0.98 times the internal diameter of the remainder of said interconnected pipes, for example equal to 0.90 to 0.96 times the internal diameter of the remainder of said interconnected pipes, for example equal to 0.90 to 0.95 times the internal diameter of the remainder of said interconnected pipes. In an embodiment, said loop reactor is the second reactor of a double loop reactor comprising a first reactor and a second reactor serially connected.

In an embodiment, the invention provides a loop reactor, said loop reactor comprising a plurality of interconnected pipes defining a flow path for a polyolefin slurry, means for introducing olefin monomer, polymerization catalyst and diluent into said reactor, one or more settling legs provided on at least one horizontal part of said interconnected pipes, and a pump suitable for maintaining said polyolefin slurry in circulation in said loop reactor, wherein the bottom ends of at least two vertical pipes are connected to each other by two horizontal pipes, and wherein at least one of said two horizontal pipes is provided with one or more settling legs, wherein the internal diameter of at least one of said two horizontal pipes provided with one or more settling legs is equal to 0.90 to 1.0 times the internal diameter of the remainder of the interconnected pipes.

The invention can be understood in detail with reference to the embodiments illustrated in FIG. 1.

FIG. 1 represents a single loop reactor 100 according to an embodiment of the invention, comprising a plurality of interconnected pipes 104 defining a reactor main path. It will be understood that while the loop reactor 100 is illustrated with six vertical pipes, said loop reactor 100 may be equipped with less or more pipes, such as 4 or more pipes, for example between 4 and 6 vertical pipes. The vertical sections of the pipe segments 104 are preferably provided with heat jackets 105. Polymerization heat can be extracted by means of cooling water circulating in these jackets 105 of the reactor.

Reactants such as diluent, monomer, optional co-monomers and reaction additives can be introduced into the reactor 100 by line 107. Catalyst, optionally in conjunction with an activation agent, can be injected in the reactor 100 via the conduct 106. In a preferred embodiment, catalysts are introduced just upstream from the circulation pump, and diluent, monomer, optional co-monomers and reaction additives are introduced just downstream of the circulation pump.

The polymerization slurry is directionally circulated throughout the loop reactor 100 as illustrated by the arrows 108 by one or more pumps, such as axial flow pump 101. The pump may be powered by an electric motor 102. As used herein the term "pump" includes any device from compressing driving, raising the pressure of a fluid, by means for example of a piston or set of rotating impellers 103.

According to the invention, the bottom ends of at least two vertical pipes are connected to each other by two horizontal pipes, 104-1 and 104-2. The two horizontal pipes 104-1 and 104-2 are connecting two points of the same loop by two alternate paths having different transit time than that of the main path. The illustrated reactor 100 is provided with three settling legs 109 connected to one pipe 104-1 of two horizontal pipes 104-1 and 104-2. It will be understood that while the loop reactor 100 is illustrated with three settling legs 109 on one of two horizontal pipes, said loop reactor 100 may be equipped with one or more settling legs on at least one of said two horizontal pipes or on both of said two horizontal pipes. As the polymerization progresses polymer slurry accumulates in these settling legs 109. The settling legs 109 are provided with an isolation valve 110. These valves 110 are open under normal conditions and can be closed for example to isolate a settling leg 109 from operation. Further the settling legs are provided with product take off or discharge valves 111. The discharge valves 111 may be any type of valve, which can permit continuous or periodical discharge of polymer slurry, when they are fully open. Polymer slurry settled in the settling legs 109 is removed by means of flash lines 113 to a product recovery zone (not shown), or, for instance to a second loop reactor as described above (not show).

The following non-limiting example illustrates the invention.

EXAMPLES

Example 1

Polyethylene is prepared by feeding ethylene monomer, catalyst, hexene comonomer, hydrogen, and isobutane diluent to a single slurry loop reactor. The loop reactor comprises 4 vertical pipes, 2 upper horizontal segments and 2 lower horizontal segments of reactor piping, joined end to end by junctions such as elbows to form a complete loop. The developed length of the reactor is about 250 m. The vertical sections of the pipe segments are provided with heat jackets. The polymer slurry is circulated by an impeller driven by a motor. One of the horizontal segments is provided with 4 settling legs.

In this example, the desired effect is obtained by reducing the circulation velocity of the polyethylene slurry from 9 m/s in the remaining sections of the loop reactor to 5 m/s in the settling legs section. This velocity reduction is achieved by increasing the reactor inside diameter from 56.0 cm in the remaining sections of the reactor to 75.0 cm in the settling legs section. The maximum solids concentration in the stratified flow in the settling legs region, hence the concentration in the slurry entering the settling legs, reaches 55% wt, whereas the solids concentration in the remaining reactor sections is 47% wt.

Example 2

Polyethylene is prepared by feeding ethylene monomer, catalyst, hexene comonomer, hydrogen, and isobutane diluent to a single slurry loop reactor. The loop reactor comprises 4 vertical pipes, 2 upper horizontal segments and 3 lower horizontal segments of reactor piping, joined end to end by junctions such as elbows to form a complete loop. The bottom ends of two vertical pipes are connected to each other by two horizontal pipes, each provided with 3 settling legs. The vertical sections of the pipe segments are provided with heat jackets. The polymer slurry is circulated by an impeller driven by a motor.

The desired effect is obtained by reducing the circulation velocity of the polyethylene slurry from 9.5 m/s in all sections of the loop reactor to 5.5 m/s in the settling legs section, while keeping 9.5 m/s in the remaining sections of the reactor. This velocity reduction is achieved by splitting the flow in the settlings legs section into 2 horizontal sections, both equipped with settling legs, and decreasing the reactor inside diameter from 48.1 cm in the remaining sections of the reactor to 44.7 cm in the two settling legs section. The maximum solids concentration in the stratified flow in the settling legs region, hence the concentration in the slurry entering the settling legs, reaches 57% wt, whereas the solids concentration in the remaining reactor sections is 49% wt.

In addition, each of the two horizontal sections mentioned before is equipped with 3 settling legs, giving a total of 6 settling legs, to be compared with 4 settling legs in prior art single loop reaction having 4 vertical pipes.

Although the present invention has been described with considerable detail with reference to certain preferred variations thereof, other variations are possible. Therefore, the spirit and scope of the appended claims should not be limited to the preferred variations described herein.

The invention claimed is:

1. A process for preparing polyolefin in a polymerization loop reactor, said polymerization loop reactor comprising:
    a plurality of interconnected pipes defining a flow path for a polyolefin slurry, and
    one or more settling legs provided on at least one horizontal part of said interconnected pipes, said process comprising:
    feeding olefin monomer, liquid diluent, polymerization catalyst, optionally hydrogen, and optionally olefin co-monomer into said polymerization loop reactor; and
    polymerizing said olefin monomer and optionally said olefin co-monomer to produce said polyolefin slurry in said polymerization loop reactor;
    wherein a circulation velocity of the polyolefin slurry inside the at least one horizontal part of said interconnected pipes provided with one or more settling legs is reduced by at least 20% and at most 60% compared to a circulation velocity inside a remainder of said polymerization loop reactor.

2. The process according to claim 1, wherein an internal diameter of said at least one horizontal part of said interconnected pipes provided with one or more settling legs is increased by a factor of at least 1.10 and at most 1.40 compared to an internal diameter of the remainder of said interconnected pipes.

3. The process according to claim 1, wherein a bottom ends of two vertical pipes are connected to each other by two horizontal pipes, and wherein both of said two horizontal pipes are provided with one or more settling legs.

4. The process according to claim 1, wherein a bottom ends of two vertical pipes are connected to each other by two horizontal pipes, wherein at least one of said two horizontal pipes is provided with one or more settling legs, and wherein an internal diameter of at least one of said two horizontal pipes provided with one or more settling legs is equal to 0.90 to 0.99 times the internal diameter of the remainder of said interconnected pipes.

5. The process according to claim 1, wherein a bottom ends of two vertical pipes are connected to each other by two horizontal pipes, and wherein the internal diameter of each of said two horizontal pipes provided with one or more settling legs is equal to 0.90 to 0.99 times the internal diameter of the remainder of said interconnected pipes.

6. The process according to claim 1, wherein said polymerization loop reactor is a single loop reactor.

7. The process according to claim 1, wherein said polymerization loop reactor is a double loop reactor comprising two serially connected loop reactors.

8. The process according to claim 1, wherein the polyolefin is polyethylene.

9. A loop reactor suitable for a polyolefin polymerization process comprising:
   a plurality of interconnected pipes defining a flow path for a polyolefin slurry,
   means for introducing olefin monomer, polymerization catalyst and diluent into said loop reactor,
   one or more settling legs provided on at least one horizontal part of said interconnected pipes, and
   a pump suitable for maintaining said polyolefin slurry in circulation in said loop reactor; wherein a bottom ends of two vertical pipes are connected to each other by two horizontal pipes, and wherein at least one of said two horizontal pipes is provided with one or more settling legs, and wherein a circulation velocity of the polyolefin slurry inside at least one horizontal part of said interconnected pipes provided with one or more settling legs is reduced by at least 20% and at most 60% compared to a circulation velocity inside a remainder of said loop reactor.

10. The loop reactor according to claim 9, wherein both of said two horizontal pipes are provided with one or more settling legs.

11. The loop reactor according to claim 9, wherein an internal diameter of at least one of said two horizontal pipes provided with one or more settling legs is equal to 0.90 to 1.0 times an internal diameter of a remainder of said interconnected pipes.

12. The loop reactor according to claim 9, wherein an internal diameter of each of said two horizontal pipes provided with one or more settling legs is equal to 0.90 to 1.0 times an internal diameter of a remainder of said interconnected pipes.

13. The loop reactor according to claim 9, wherein an internal diameter of at least one of said two horizontal pipes provided with one or more settling legs is equal to 0.90 to 0.99 times an internal diameter of a remainder of said interconnected pipes.

14. The loop reactor according to claim 9, wherein an internal diameter of at least one of said two horizontal pipes provided with one or more settling legs is equal to 0.90 to 0.95 times an internal diameter of a remainder of said interconnected pipes.

15. The process according to claim 1, wherein an internal diameter of said at least one horizontal part of said interconnected pipes provided with one or more settling legs is increased by a factor of at least 1.10 and at most 1.50 compared to an internal diameter of the remainder of said interconnected pipes.

16. The process of claim 15, wherein the internal diameter of said at least one horizontal part of said interconnected pipes provided with one or more settling legs is increased by a factor of at least 1.30 and at most 1.36 compared to an internal diameter of the remainder of said interconnected pipes.

17. The process according to claim 1, wherein a bottom ends of two vertical pipes are connected to each other by two horizontal pipes, and wherein at least one of said two horizontal pipes is provided with one or more settling legs.

18. The process according to claim 17, wherein an internal diameter of at least one of said two horizontal pipes provided with one or more settling legs is equal to 0.90 to 0.95 times the internal diameter of the remainder of said interconnected pipes.

* * * * *